UNITED STATES PATENT OFFICE.

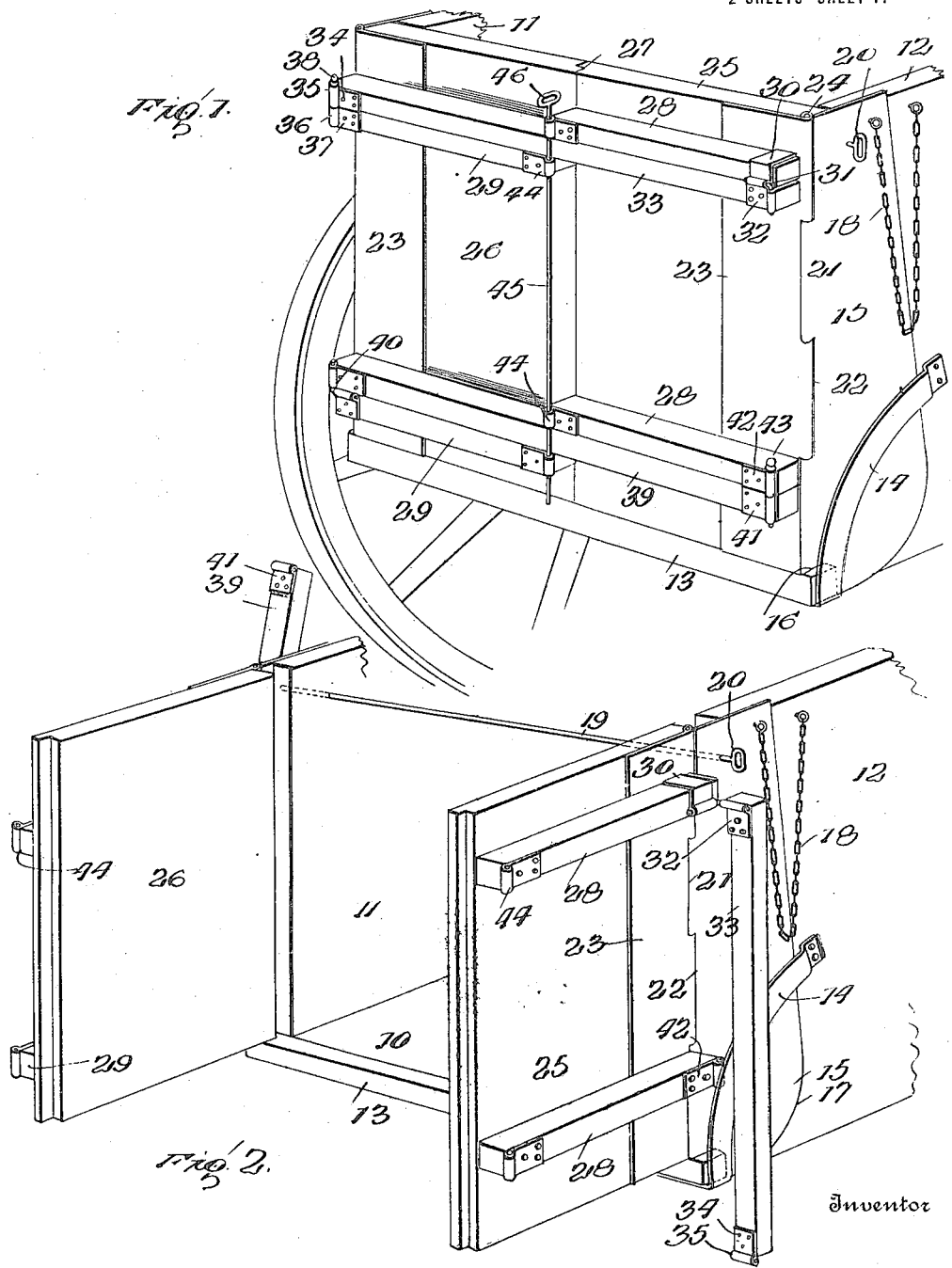

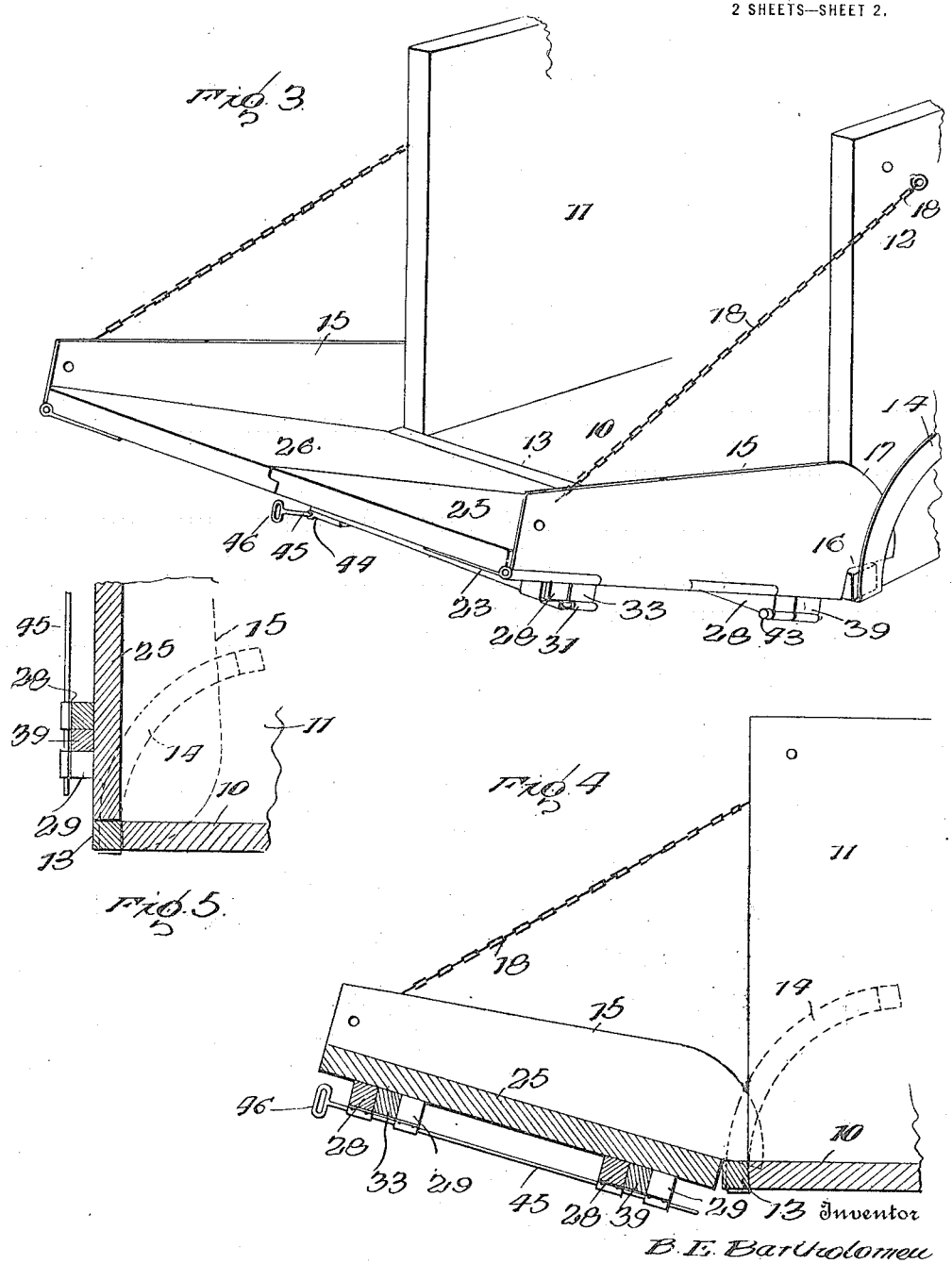

BERT E. BARTHOLOMEW, OF ALGONA, IOWA.

COMBINED DUMP END-GATE AND SCOOP-BOARD.

1,207,266.　　　　　Specification of Letters Patent.　　Patented Dec. 5, 1916.

Application filed January 8, 1916. Serial No. 71,043.

*To all whom it may concern:*

Be it known that I, BERT E. BARTHOLOMEW, a citizen of the United States, residing at Algona, in the county of Kossuth and State of Iowa, have invented certain new and useful Improvements in Combined Dump End-Gates and Scoop-Boards, of which the following is a specification.

My invention relates to new and useful improvements in combined dump end gates and scoop boards, the primary object of my invention being the provision of a closure for wagon bodies which may be utilized either as a scoop board or as a dump end gate according as alternate fastening devices are released.

A still further object of my invention consists in the provision of a structure of the above described character including co-acting end gate sections each hinged at one edge to wings or shields swingingly supported by the sides of the wagon body, together with means which may be applied to prevent swinging of the wings, and means which may be applied to prevent swinging of the gate sections with respect to the wings and to each other.

Another object in connection with the above is the provision of a fastening means for connecting the gate sections of such a nature that the sections may be simultaneously lowered by swinging of the wings to provide a scoop board and further of such a nature that upon release of the fastening means, assuming the wings to be secured against swinging, the gate sections may have their adjacent edges swung away from each other to permit dumping the contents of the wagon or to facilitate the loading or unloading of live stock.

With these and other objects in view, my invention will be more fully described, illustrated in the accompanying drawings, and then specifically pointed out in the claims which are attached to and form a part of this application.

In the drawings: Figure 1 is a fragmentary perspective view of the rear end of a conventional form of wagon, showing my gate structure in closed position; Fig. 2 is a corresponding view, showing the gate employed as a dump end gate and in open position; Fig. 3 is a corresponding view, showing the use of the gate as a scoop board; Fig. 4 is a vertical sectional view taken through the wagon body and gate with the latter in the position shown in Fig. 3; Fig. 5 is a fragmentary view corresponding to Fig. 4, but with the gate in closed position.

Corresponding and like parts are referred to in the following description and indicated in all the views of the drawings by the same reference characters.

In order to insure a clear and accurate understanding of my invention, I have shown my improved gate as employed in connection with a wagon body having a bottom 10 and side walls 11 and 12. Secured to the rear edge of the bottom 10, with its upper face in the plane of the upper face of the bottom, is a supporting brace 13 which extends transversely of the wagon and projects at its ends somewhat beyond the outer faces of the side walls of the wagon. This brace may be of any suitable material, either wood or metal. Arcuate retaining guides 14, of heavy sheet metal, are secured at one end to the outer faces of the side walls of the wagon and at their opposite ends to the ends of the brace 13, those ends secured to the walls of the wagon being offset in order to space the intermediate portions of the guides from the sides of the wagon. Wings or shields 15, at their lower rear edges, are cut-away to provide seats 16 to engage about the extended ends of the brace 13 and at their lower forward edges are cut-away arcuately, as shown at 17, to permit their swinging about the brace ends as a pivot. The extent of swinging movement of these wings or shields is limited by flexible connections, such as chains 18, secured at one end to the side walls of the wagon and at their other ends to the upper or outer ends of the shields. In normal raised position, such as shown in Fig. 1, the shields may be locked against downward swinging movement by means of an end gate rod 19 having a handle forming eye 20 at one end, this rod being passed through openings formed in the shields and in the side walls of the wagon in such a manner as to aline with each other when the shields are in raised position.

The rear or lower edges of the shields are bent to provide spaced alined pintle ears 21 which interengage with corresponding ears 22 formed upon brace plates 23 which are hingedly connected to the shields by pintle rods 24. Secured to the inner faces of these brace plates 23 are the co-acting door sections 25 and 26, the free edges of which are cut-away longitudinally to provide a lap joint, as shown at 27 in Fig. 1, when the sections are in closed position. As shown, when the sections are closed their outer edges abut against the inner faces of the shields 15 and their lower edges rest upon the upper face of the brace bar 13.

Transverse braces 28 are secured to the outer face of the section 25 near its upper and lower ends, extending throughout the width of the section and corresponding braces 29 are similarly secured to the door section 26, the sole difference being that the corresponding braces 29 are secured at different parts of the gate section 26 than are the braces 28 in order that each brace of one gate section may be at a somewhat higher level than the corresponding brace of the other. An L-shaped hinge plate 30 is secured to the outer end of the upper brace 28 to receive one arm of an L-shaped pintle pin 31, the opposite arm of which is received by a hinge plate 32 carried by one end of a locking brace 33 which extends throughout the width of the entire gate and which, at its opposite end, carries a locking plate 34 having an eye 35 adapted to aline with an eye 36 formed upon a corresponding locking plate 37 carried by the outer end of the upper brace 29 in order that a locking pin or rod 38 may be passed through both eyes to secure the locking brace 33 against swinging movement. As shown, this brace is proportioned to engage snugly between the braces 28 and 29 and thereby assist in preventing any independent movement of the gate sections 25 and 26. A second locking brace 39 is hinged to the outer end of the lower brace 29 by a hinge 40 identical in construction to the hinge previously described and is provided at its outer end with a locking plate 41 co-acting with a locking plate 42 carried by the outer end of the lower brace 28 to receive a locking pin or bolt 43. It will, therefore, be clear that one of the locking braces is hingedly connected to one door section and the other to the other door section in such a manner that they may, when released, swing with their respective door sections or be swung independently thereof. As an additional securing means for the end gate, I provide the inner ends of all of the braces 28 and 29 with locking plates having alined eyes 44 to receive the locking rod 45 which, at its upper end, is provided with a handle 46 also serving as a means for preventing its slipping through the eyes. As will be clear, this locking rod 45 extends across the locking braces 33 and 39 and, consequently, assists the locking pins 38 and 43 in holding these braces in place.

In use, when the gate is closed, it occupies the position shown in Fig. 1, all of the locking rods and pins being in use. If the gate is to be used as a dump end gate, the contents of the wagon may be discharged by opening the gate to the position shown in Fig. 2. This is done by removing the locking rod 45 and one or the other of the pins 38 and 43 to permit the swinging of one of the locking braces 33 and 39 to one side. The other of the pins 38 and 43 is then removed, pressure being exerted against the locking brace which it secures to prevent flying open of the gate sections under pressure of the contents of the wagon and the gate then permitted to gradually open under such pressure, its opening being controlled by holding the locking brace last released against the free edges of the gate sections. In this position, the hinged edges of the gate sections are supported by the wagon body brace 13 and by the shields 15 which are still locked to the sides of the body of the wagon by the end gate rod 19.

When the gate is employed as a scoop board, assuming that it is closed, as shown in Fig. 1, the gate may be lowered merely by withdrawing the end gate rod 19. Under these conditions, the lower edge of the gate abuts against the rear edge of the brace 13 and the gate is supported partially by engagement of the shields 15 about the ends of the brace 13 and partially by the chains 18. The position then occupied by the gate is clearly shown in Figs. 3 and 4 of the drawings.

Although I have illustrated and described my invention in all its details, it will of course be understood that I do not wish to limit myself to the specific details of construction, as various minor changes, within the scope of the appended claims, may be made at any time without departing from the spirit of my invention.

If desired, when opening the gate in the manner shown in Fig. 2, the locking braces 33 and 39 may be swung about the horizontally disposed arms of their L-shaped pintle pins to bring the opposite arms of the pins into the same horizontal plane and the bars may then be swung downwardly and upwardly to the positions shown in Fig. 2 where they will be out of the way. This is the advantage of the L-shaped hinge construction illustrated and described.

Having thus described the invention, what is claimed as new is:

1. A gate for wagons including shields adapted to be swingingly supported by the sides of a wagon, means for holding the shields against swinging movement, gate sections hinged at their outer edges to the shields, braces extending transversely of the gate sections, the brace of one section being vertically spaced above that of another, locking braces hinged to certain of shields, braces extending transversely of both sections, and means for securing the free ends of the locking braces to the adjacent ends of other braces.

2. A gate for wagons including shields adapted to be swingingly supported by the sides of a wagon, means for holding the shields against swinging movement, gate sections hinged at their outer edges to the shields, braces extending transversely of the gate sections, the brace of one section being vertically spaced above that of another, a locking brace hinged to one of the braces and extending transversely of both sections, and means for securing the free end of the locking brace to the adjacent end of other braces, the locking brace being disposed between vertically spaced braces to engage against opposed faces thereof.

3. A wagon gate including co-acting gate sections hingedly supported at their outer edges, braces extending transversely of each section adjacent their ends, the braces of one section being disposed at a slightly higher level than the corresponding braces of the other section, locking braces hinged one to the outer end of the upper brace of one section and the other to the outer end of the lower brace of the other section and adapted to be swung to lie between the upper and lower braces of both sections and to extend entirely across the gate, the free ends of certain of the braces and of the locking braces being formed with eyes which aline when the locking braces are in place and the inner ends of the gate section braces being formed with similar eyes, and locking rods insertible through the alined eyes to secure the gate sections in place.

4. A gate for wagons including gate sections adapted to be hingedly secured to the sides of a wagon, braces extending transversely of the gate sections, the brace of one section being spaced above that of the other, a locking brace adapted to be positioned transversely of both sections and to lie between the braces, a vertically disposed eye formed upon one end of the locking section, a horizontally disposed eye formed upon the adjacent end of one of the brace sections, an L-shaped pintle pin engaging through the eyes, and means for detachably securing the free end of the locking brace to the adjacent end of the other transverse brace.

In testimony whereof, I affix my signature.

BERT E. BARTHOLOMEW. [L. S.]

Copies of this patent may be obtained for five cents each, by addressing the "Commissioner of Patents, Washington, D. C."